L. B. MAY.
POWER TRANSMISSION APPARATUS.
APPLICATION FILED DEC. 3, 1909.
985,427.
Patented Feb. 28, 1911.
4 SHEETS—SHEET 3.
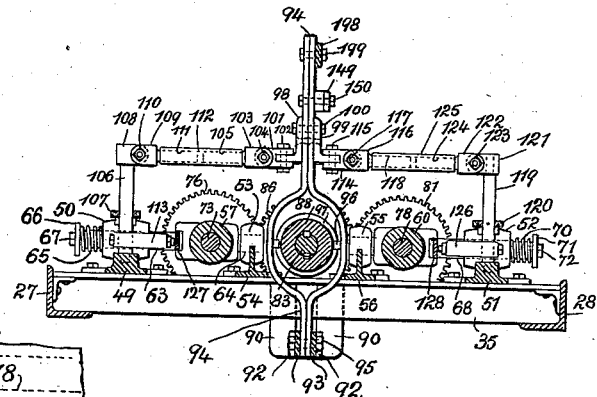
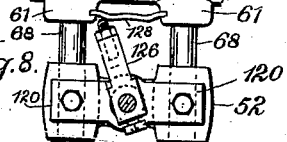
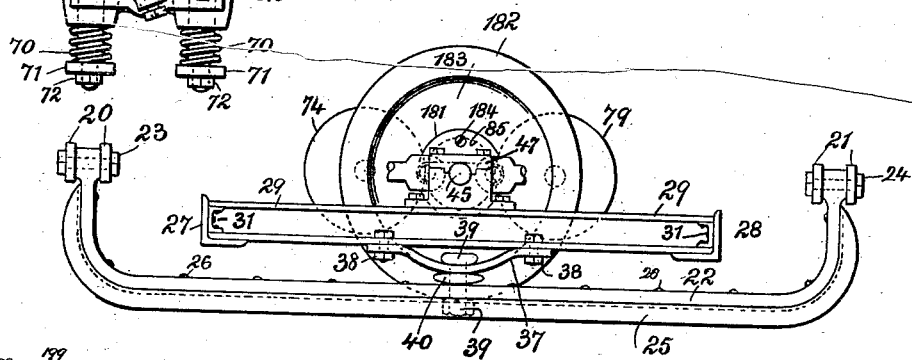
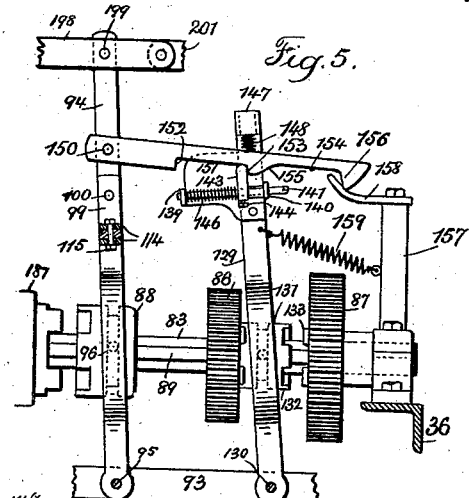
Inventor
Louis B. May.
by Harold Serrell
his atty

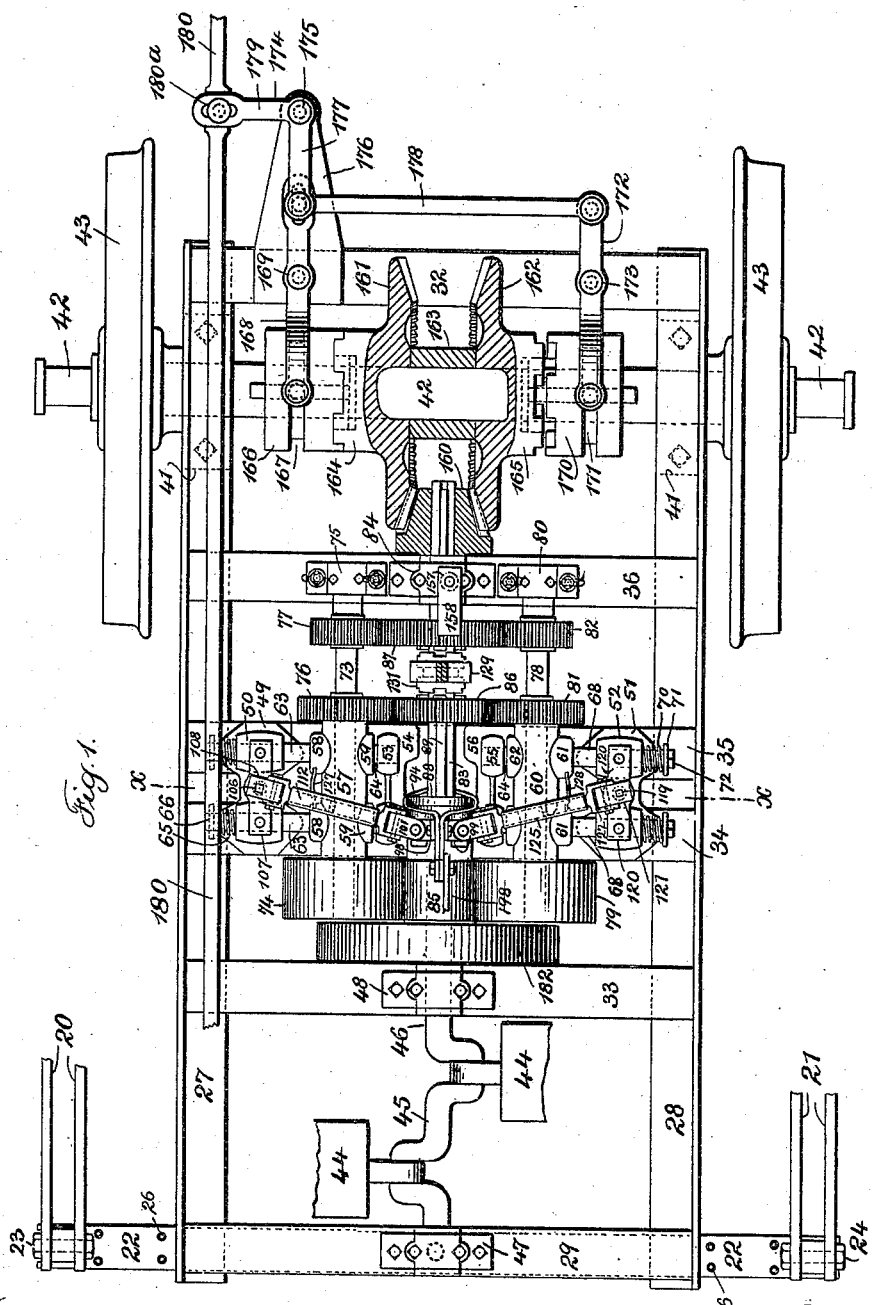

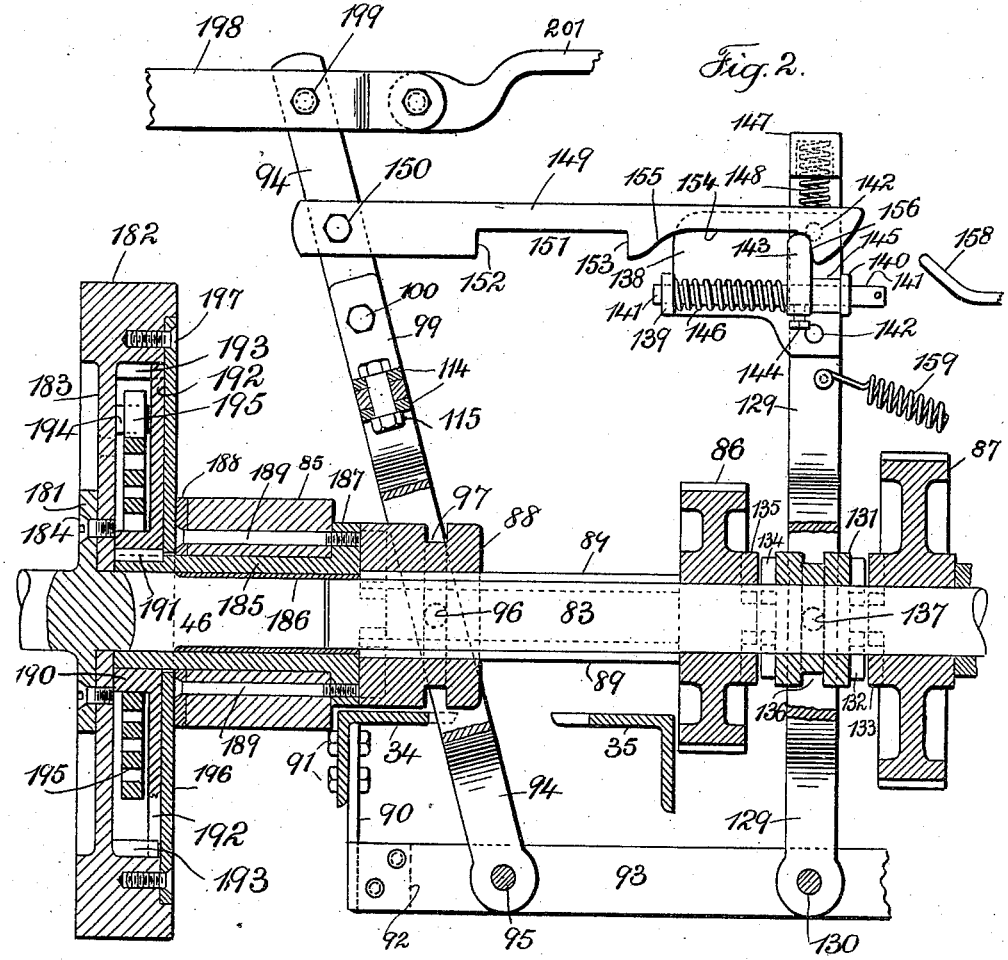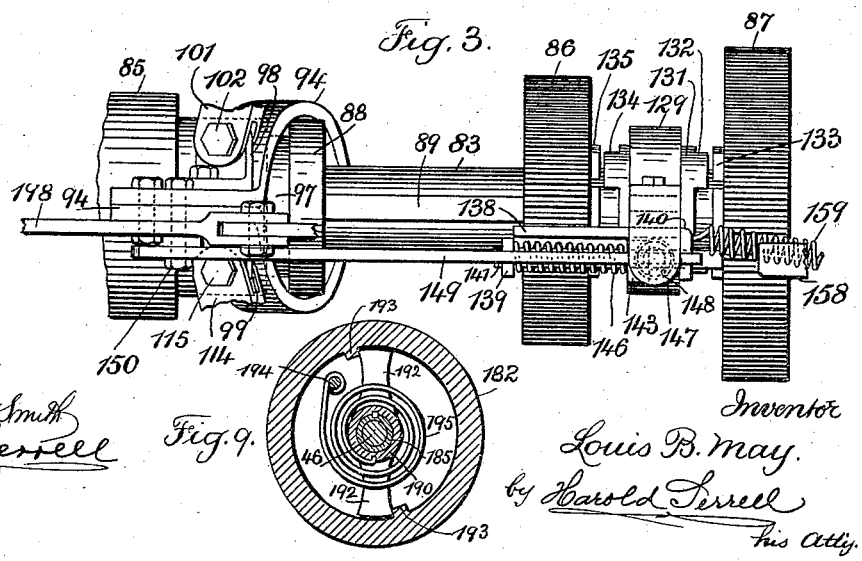

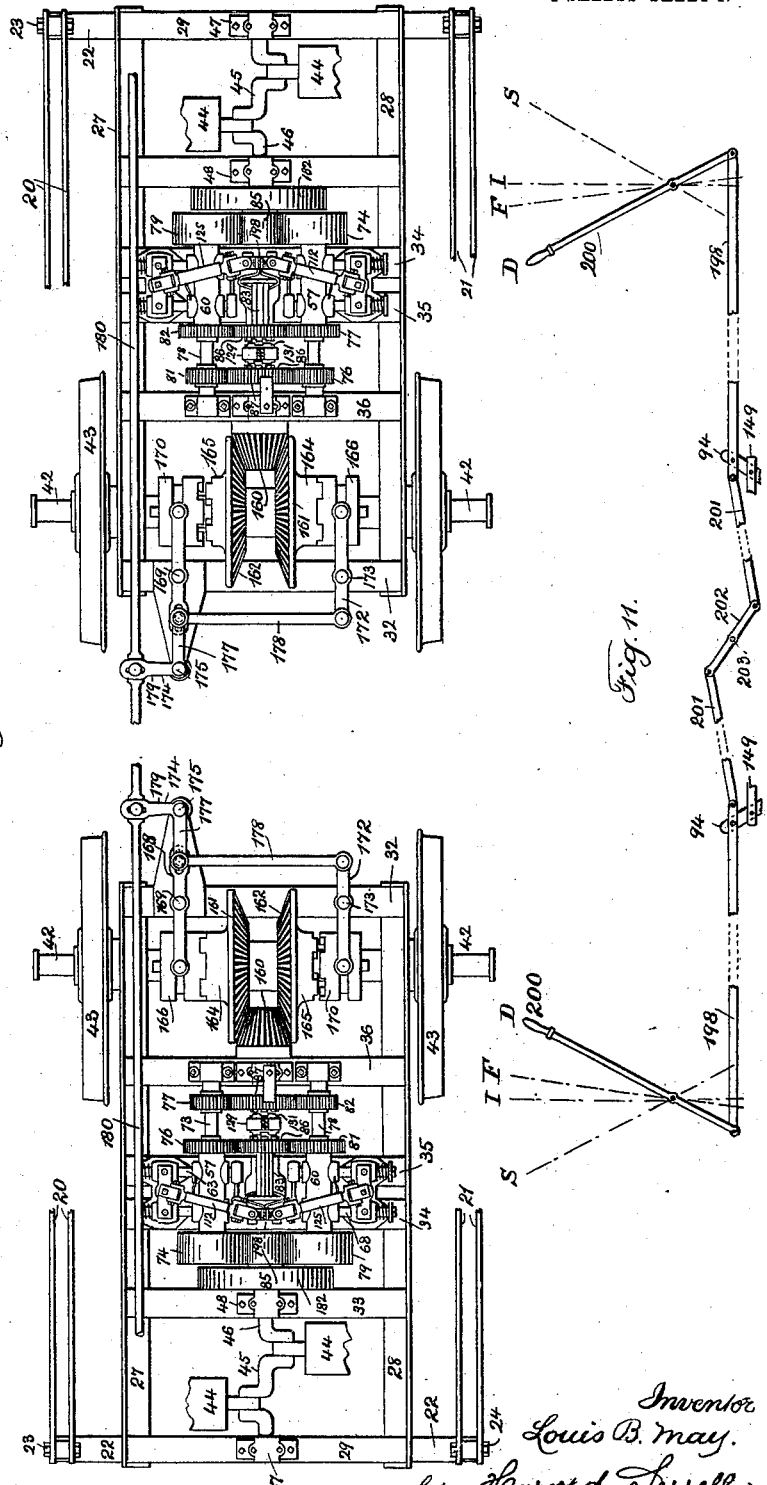

UNITED STATES PATENT OFFICE.

LOUIS B. MAY, OF NEW YORK, N. Y.

POWER-TRANSMISSION APPARATUS.

985,427.

Specification of Letters Patent. Patented Feb. 28, 1911.

Application filed December 3, 1909. Serial No. 531,165.

*To all whom it may concern:*

Be it known that I, LOUIS B. MAY, a citizen of the United States of America, residing in the borough of Manhattan, city, county, and State of New York, have invented an Improvement in Power-Transmission Apparatus, of which the following is a specification.

This invention relates to a power transmission apparatus adapted particularly for motor vehicle use and is an improvement upon the transmission apparatus shown and described in my pending application Serial #470,425, filed January 2, 1909, for Letters Patent for an improvement in transmission devices.

The object of my present invention is the provision of a power transmission apparatus operated by a single controlling device from either end of the vehicle in such a manner that the vehicle is driven from and by a self-contained prime mover at various speeds either through suitable reducing gears or directly by the prime mover; the peculiar construction of the apparatus and the features of the invention being hereinafter more particularly described in this specification and pointed out in the claims.

In the drawing, Figure 1 is a plan and partial section illustrating the transmission apparatus comprising my present invention. Fig. 2 is an enlarged central vertical section through the drive and intermediate shafts and the parts associated therewith for effecting the changes in speed at which the vehicle may be driven. Fig. 3 is a plan view of the parts shown in the right hand portion of Fig. 2. Fig. 4 is an elevation of the speed changing devices shown in the opposite position to that indicated in Fig. 2. Fig. 5 is a view similar to Fig. 4 showing these devices in the position intermediate of that shown in Figs. 2 and 4. Fig. 6 is an end elevation of the parts as shown in Fig. 1. Fig. 7 is a transverse section taken approximately on the line x, x, Fig. 1. Fig. 8 is a partial plan of the devices employed for actuating the gear shafts to throw the friction gears into and out of contact. Fig. 9 is a partial elevation illustrating some of the parts associated with the fly-plate. Fig. 10 is a view on a reduced scale similar to Fig. 1 illustrating the application of my improved transmission device to both ends of a motor vehicle and Fig. 11 is a diagrammatic elevation of the rods and associated levers for starting, stopping and controlling the speed of the vehicle.

In the drawing, 20 designates the side members of the frame of the vehicle on one side thereof and 21 designates similar members on the opposite side thereof.

At the respective ends of these side members 20 21 a depending shallow U-shaped member 22 is connected by means of bolts 23 24 respectively. This depending U-shaped member is preferably reinforced by a channel member 25 which is secured to the under side thereof by rivets 26 or otherwise.

The support frame for the transmission apparatus preferably comprises the longitudinal members 27 28. These longitudinal members 27 28 are preferably made of angle irons and at their outer ends are connected by an I-beam cross-piece 29 with the intermediate blocks or short channels 31. At their inner ends these two members 27 28 are connected by a cross-piece 32 and between the end cross-pieces the longitudinal members 27 28 are connected also by the intermediate cross-pieces indicated respectively at 33 34 35 and 36.

Connected centrally to the under side of the cross-piece 29 is a spring member 37; the connection being made by bolts 38 or otherwise, and the transmission apparatus frame is secured to the depending U-shaped member 22 by a bolt 39 passing through the spring 37 and this depending U-shaped member and also through an intervening elliptical member 40 or otherwise. At the opposite end the transmission apparatus frame is supported upon the driven shaft 42 by means of suitable bearings 41 shown in dotted lines Fig. 1, in a manner precisely similar to that shown and described in my co-pending application aforesaid, or otherwise, and connected to this driven shaft 42 are the drive wheels 43 of the vehicle.

Supported in a suitable manner at the outer end of the transmission apparatus frame is a prime mover which may be of any desired type, as for instance a hydrocarbon engine, the cylinders of which are indicated at 44; 45 being the crank shaft of the engine and 46 the end of the drive shaft which is journaled in suitable bearings 47 48, the former of which is connected to the cross-piece 29 and the latter to the cross-piece 33.

Supported upon, connected to and extending between the cross-pieces 34 35 at one end thereof, I employ a base 49 connected to which are bearings 50 and at the opposite ends of the cross-pieces 34 35 there is a base 51 and bearings 52. Also supported upon the cross-pieces 34 35 and on the same side of the center as the base 49 there are bearings 53 preferably supported on the T-bar 54 secured to the said cross-pieces, and similarly on the other side of the center of these cross-pieces are bearings 55 upon the T-bar 56 which is connected to the said cross-pieces. The bearings 53 are in alinement with the bearings 50 and the bearings 55 are in alinement with the bearings 52.

57 designates a sleeve which is provided on one side thereof with bosses 58 and on the opposite side and in corresponding positions with bosses 59. 60 also designates a sleeve similar to the sleeve 57 and which is therefore provided on one side with bosses 61 and on the opposite side with bosses 62. Rods 63 are secured at one end in the bosses 58 and extend respectively through the bearings 50. Short rods 64 are secured in the bosses 59 and extend into and are journaled in the bearings 53.

On the free ends of the rods 63 there are springs 65 which preferably surround the said rods and extend from the adjacent faces of the bearings 50 to washers 66 secured on the free ends of the rods 63 by means of the nuts 67 or otherwise. Similarly on the opposite side of the apparatus the rods 68 are secured to the bosses 61 and extend through and are journaled in the bearings 52 and the short rods 64 are fixed in the bosses 62 and extend into and are journaled in the bearings 55. Surrounding the outer free ends of the rods 68 there are springs 70 extending between the faces of the bearings 52 and the washers 71 secured on the outer ends of the rods 68 by means of the nuts 72 or otherwise.

73 designates a gear shaft which passes through and is journaled in the sleeve 57. On one end adjacent to the side of the cross-piece 34 a friction gear 74 is fixed on this shaft 73. The opposite end of this shaft 73 is journaled in a slidable bearing 75 connected to and supported upon the cross-piece 36 and on this shaft 73 between the cross-pieces 35 and 36 there are secured gear wheels 76 and 77; these gear wheels being made fast to the shaft by suitable keys or in any other manner. 78 also designates a gear shaft and this shaft passes through and is journaled in the sleeve 60. On one end of the shaft 78 adjacent to the side of the cross-piece 34 there is secured thereon a friction gear 79 and at its opposite end this shaft 78 is journaled in a slidable bearing 80 which is supported upon and connected to the cross-piece 36. On the shaft 78 between the cross-pieces 35 and 36 there are gear wheels 81 82 and these gears are also keyed to the shaft 78 or otherwise fixed thereon.

83 designates an intermediate shaft and adjacent to one end this intermediate shaft is journaled in a bearing 84 secured on the cross-piece 36 between the slidable bearings 75 and 80, and at its opposite end this intermediate shaft terminates at a point adjacent to the end of the drive shaft within a bushing 185, as will be hereinafter described. On this end of the drive shaft there is a friction gear 85 coming intermediately between the friction gears 74 and 79 which latter are adapted to move into and out of frictional engagement with the said gear 85.

On the intermediate shaft 83 between the cross-pieces 35 and 36 there are gear wheels 86 and 87, the former of which is adapted to mesh with the gear wheels 76 and 81 and the latter with the gear wheels 77 and 82. On this intermediate shaft 83 above the cross-pieces 34 35 there is a clutch member 88. This clutch member is secured to the shaft by a key 89 in such a manner as to be turned therewith and at the same time to be slidable longitudinally thereon.

In suitable positions pairs of plates 90 are connected to the cross-pieces 34 and 36 by means of bolts 91 or otherwise; only one of these pairs of plates being shown and illustrated in Fig. 2.

Extending between and connected to the portions 92, turned at right angles from each of these pairs of plates, are bars 93.

94 represents an operating or control lever which at one end extends between the bars 93 and is pivotally connected thereto as indicated at 95. It will be understood that while I have illustrated this control lever as made in two parts or sections, the same may be an integral structure if so desired. The parts of this control lever span the clutch member 88 and in suitable positions there are trunnions 96 which extend into the circular groove 97, provided in the surface of the clutch member 88, in order that the said clutch member may be moved longitudinally on the shaft by the movement of the said control lever 94. Connected to the said control lever on the opposite sides thereof are the brackets 98 99. These brackets may be secured in position on the sides of the lever by means of bolts 100 or otherwise.

101 designates a head which is slotted to receive the outstanding arm of the bracket 98 to which the said head 101 is connected by a bolt 102.

103 is a yoke member which is connected to the head 101 by a bolt 104 and extending from the yoke member 103 there is a pin 105. On this side of the apparatus is a shaft 106 which is reduced at one end; this reduced end being journaled in the base 49. The shaft 106 passes through an opening provided therefor in the guide bar 107 extending between and connected to the bearings 50 and at its opposite end the shaft 106 is provided with a head 108 to which is connected the yoke 109 by the bolt 110; the yoke 109 being provided with an extension pin 111 similarly to the yoke 103, and extending between the yoke members 103 and 109 and fitting over the said pins thereof is a tube 112, and secured on the shaft 106 is an arm 113, the free end of which is reduced in cross section and the function of which is hereinafter described. Similarly on the opposite side of the apparatus a head 114 is connected to the outstanding arm of the bracket 99 by a bolt 115 and a yoke 116 is connected to the head 114 by a bolt 117 and this yoke 116 is also provided with an outstanding pin 118.

A shaft 119 similar to the shaft 106 is also reduced in cross section at one end thereof and this reduced end is journaled in the base 51. The shaft 119 passes through an aperture provided therefor in the guide bar 120 which extends between and is connected to the bearing 52.

At the upper end of the shaft 119 a head 121 is secured. A yoke 122 is connected to the head 121 by a bolt 123 or otherwise, and this yoke 122 is also provided with an outstanding pin 124. A tube 125 passes over the said pins 118 124 and extending between the said yokes 116 and 122. The rod 119 is also provided with an arm 126 secured thereto beneath the guide bar 120.

Extending between the bosses 58 there is a cam-faced member 127 against which the reduced end of the arm 113 is adapted to contact and slide, and similarly on the opposite side of the apparatus a cam-faced member 128 extends between and is connected to the bosses 61 and the reduced end of the arm 126 is adapted to contact and slide upon the cam-faced member.

129 designates a gear clutch lever, one end of which passes between the bars 93 and is pivotally connected thereto as indicated at 130. On the intermediate shaft between the gears 86 87 there is a clutch member 131 provided on one side with clutch lugs 132 adapted to enter the recesses between the clutch lugs 133 on the hub of the gear 87 and on the opposite side of this clutch member 131 are clutch lugs 134 adapted to enter the recesses between the clutch lugs 135 on the hub of the gear 86. The clutch member 131 is secured to the intermediate shaft by a suitable key or otherwise in such a manner as to turn therewith and at the same time to be longitudinally slidable thereon. The clutch lever 129 may also be made in two sections, portions of which are separated so as to span the clutch member 131, which separated portions are provided with trunnions 137 adapted to enter the circumferential groove 136 in the surface of the clutch member 131 so that this clutch member may be moved in either direction along the shaft to engage with the gear wheel 86 and gear wheel 87 by the movement of the clutch lever 129.

Adjacent to its upper extremity the clutch lever 129 is provided with a plate 138 which may be secured thereto by the rivets 142 or otherwise. In suitable positions this plate 138 is provided with out-turned portions 139 140 which are preferably at right angles thereto and each provided with a suitable opening adapted to receive a rod 141.

Connected to the rod 141 is an arm 143 extending upwardly therefrom and secured in position by means of a set-screw 144 or otherwise. This arm 143 is normally maintained in position against the stop 145 by means of a spring 146 extending around said rod 141 between the said arm 143 and the adjacent face of the out-turned portion 139. The stop 145 is preferably a sleeve on the rod 141 and normally abuts against the inner face of the out-turned portion 140 of the plate 138.

At its upper end the gear clutch lever 129 is provided with a cap 147 adapted to receive one end of a helical or other spring 148, the opposite end of which bears against the upper surface of a link 149, one end of which is pivotally connected to the control lever 94 as indicated at 150. On its under side the link 149 is provided with an elongated recess 151; the opposite sides 152 153 forming this recess being preferably parallel to one another and at right angles to the longitudinal edge of the link. This link 149 is also provided nearer its free end with a recess 154, the faces forming which are preferably curved as indicated at 155 and 156 respectively.

Secured in the cap of the bearing 84 is a standard 157 and connected at the upper end of this standard 157 is a trip arm 158 and a spring 159 connects the gear clutch lever 129 with this standard 157.

On the end of the intermediate shaft, extending beyond the cross-piece 36 a bevel gear 160 is secured by being keyed thereto or otherwise. Mounted loosely on the driven shaft 42 there are bevel gears 161 162. These gears are separated by a collar 163 and are both adapted at all times to mesh with the bevel gear 160 on the end of the intermediate shaft. A clutch member 164 is connected to or integral with the gear 161 and similarly a clutch member 165 is connected to or is integral with the gear 162.

On the driven shaft 42 there are clutch members 166 and 170, the former being adapted to engage with the clutch member 164 and the latter with the clutch member 165. The clutch member 166 is provided with a circumferential recess 167 adapted to receive suitable trunnions on a yoke lever 168 which is pivotally connected as indicated at 169 in the cross-piece 32. The clutch member 170 is provided with a circumferential recess 171 adapted to receive suitable trunnions on the yoke lever 172 which is also pivoted in the cross-piece 32 as indicated at 173; it being understood that the clutch members 166 and 167 are so connected to the driven shaft 42 by means of keys or otherwise as to be turned therewith and at the same time to be slidable thereon.

174 designates a bell-crank lever which is pivoted at 175 in a bracket 176 connected to the cross-piece 32 and the arm 177 of the bell crank lever together with one end of a link 178 are pivotally connected to the end of the yoke lever 168, and the opposite end of the link 178 is pivotally connected to the end of the yoke lever 172. The other arm 179 of the bell crank lever 174 is pivotally connected to a rod 180 as indicated at 180$^a$.

Adjacent to the inner side of the cross-piece 33 the drive shaft is provided with a flange 181. On this portion of the drive shaft there is also a fly-wheel, the rim of which is indicated at 182. This rim 182 is connected to the flange 181 by being provided with a web 183 which is fastened to the flange 181 by the screws 184 or otherwise. On the end of the drive shaft there is a sleeve 185 fitting over a bushing 186 and at one end this sleeve 185 is provided with a flange 187; the opposite end of the sleeve extending to the adjacent face of the fly-wheel web 183, and as will be understood, this sleeve 185 and its bushing 186 are loosely mounted on the drive shaft. The friction gear 85 is mounted on the sleeve 185 and extends between the flange 187 thereof and a plate 188 on the opposite side of the friction gear and is held in position relatively to the sleeve by screws 189 which pass through the plate 188, through the friction gear 85 and into the flange 187.

190 designates a hub which is secured on the end of the sleeve 185 by means of a key 191 or otherwise, and secured to or integral with this hub 190 there are oppositely extending spoke members 192 adapted to abut against and be positioned by stop lugs 193 suitably secured within the fly-wheel. 194 also designates a pin which is preferably secured to the web 183 of the wheel in any suitable position, and 195 designates a helical spring one end of which is connected to the pin 194 and the other end of which is fixed in the hub 190. These parts are secured within the rim of the wheel and inclosed therein by means of the plate 196 secured in position within a recess provided therefor in the rim of the wheel by the screws 197 or otherwise.

A rod 198 is pivotally connected to the upper end of the control lever 94 as indicated at 199 and by reference to Fig. 11 this rod 198 is suitably connected to an operating lever 200.

By reference to Fig. 10, it will be apparent that a motor vehicle may be fitted at both ends with the transmission apparatus as hereinbefore described and that the rods 198 of each apparatus and the members connecting the same, such as links 201, may be connected to a lever 202 suitably pivoted as indicated at 203 so that the operation of the apparatus will be the same from both ends of the vehicle which may be operated by the apparatus at either end singly or both ends simultaneously.

In the operation of the hereinbefore described transmission apparatus the starting, stopping and the various speeds at which the vehicle may be run are all controlled from and by the single operating lever indicated diagrammatically at 200 in Fig. 11. Now assuming that the engine has been started and the lever 200 is in the vertical or upright position I, the position and relationship of the operating parts will be one intermediate of those shown in Figs. 4 and 5, that is to say, the clutch member 88 will be disengaged and the clutch 131 will also be disengaged and the engine will drive the gear shafts 73 and 78 through the auxiliary drive friction gears 85 74 79; the gears 86 and 87 being turned loosely on the intermediate shaft 83 by the gears 76 and 81 and 77 and 82 respectively. Now assuming that the control lever 200 is moved to the extreme forward position indicated at S in Fig. 11, the lever 94 will be moved to a position still farther toward the right and the lever 129 moved in the like direction through the link 149, coming in contact with the arm 143 and thereby effecting the movement of this lever 129 so that the clutch 131 engages the gear wheel 87, whereby the intermediate shaft is turned from the prime mover through the auxiliary friction gears 85 74 79, the gear shafts 73 78 and the reduction gear wheels 77 82 thereon and driven shaft turned by means of the bevel gear 160 and either the one or the other of the bevel gears 161 162, depending upon which of the clutch members 166 170 is in engagement; it being manifest that when one of these clutches is engaged the vehicle will travel forward and when the other clutch is engaged the vehicle will travel backward, and that these clutches 166 170 are actuated and controlled from and by a lever moving the rod 180 to actuate the bell-crank lever 174 and simultaneously swing both the yoke levers 168 172 in like directions. Now by swinging the control lever 200 from the position shown at S in Fig. 11, to that indicated at F, the rod 198 will be moved from right to left on the end of the vehicle as shown in Figs. 1, 2, 3, 4 and 5, thereby swinging the lever 94 from the position shown in Fig. 4 to that shown in Fig. 5, and moving the clutch 88 a corresponding distance. During the first part of this movement of the lever 94 the base of the recess 151 in the link 149 will slide over the end of the arm 143 until the end of this arm contacts with the face 153 of this recess 151; thereupon and during the continued movement of the lever 94 the lever 129 will also be moved from right to left by the link 149 engaging the arm 143; it being understood that the spring 146 is sufficiently strong to effect the continued movement of the lever 129 so as to disengage the clutch 131 from the gear 87 and to so move the clutch 131 as to cause its engagement with the gear 86, when the parts will assume the position shown in Fig. 5 and the control lever 200 will be in the position indicated at F Fig. 11. In this position the intermediate shaft 83 is driven in a manner precisely similar to that hereinbefore described with the exception that the reduction gear wheels 81 86 and 76 are employed instead of the gears 82 87 and 77. Now by moving the control lever 200 from the position indicated at F Fig. 11 to the extreme inward position indicated at D in this figure, the rod 198 will be moved still farther right to left and likewise swinging the lever 94 still farther in the same direction. During the initial portion of this movement the arm 143 is caused to yield against the action of the spring 146 and simultaneously the link 149 is raised by the trip-arm 158 so that the yielding movement of arm 143 is relatively small. The link 149 having been tripped, the spring 159 causes the lever 129 to move from left to right, thereby disengaging the clutch 131 from the gear wheel 86 and permitting the arm 143 to come into contact with the face 156 of the recess 154 in the link 149; it being understood that the end of the arm 143 is maintained in contact with the hereinbefore described faces of the recesses in the link 149 by means of the action of the spring 148 which contacts with and slides over the upper surface of this link 149.

When the control lever 200 has assumed the position D in Fig. 11, the lever 94 will have assumed the position shown in Fig. 2 and all the parts moved from the position shown in Fig. 5 to those indicated in Fig. 2.

When the lever 94 is in the position shown in Fig. 2, the clutch 88 will have been moved sufficiently from right to left to engage the sleeve 185 on the drive shaft, whereby the drive shaft and intermediate shaft will be connected together directly. During this movement of the clutch 88 the arms 113 and 126 will be moved along the faces of the cam-faced members 127 128 by means of the rods 106 and 119 and their hereinbefore described connections with the lever 94, and this movement of the arms 113 126 is such as to free the extremities thereof from the said cam-faced members, thereby permitting the action of the springs 65 and 70 to come into play to move the sleeves 57 60 from the intermediate shaft, thereby disengaging the auxiliary friction gears 85 74 and 79; it being understood that the rods 63 and 68 slide in their respective bearings as do also the movable parts of the slidable bearings 75 and 80. This movement however, is relatively slight, being just sufficient to disengage the said friction gears and not sufficient to cause the disengagement of the gear wheels 76 81 from the gear wheel 86 or the gear wheel 87 from the gear wheels 77 and 82 with which these speed change gears always remain in mesh. It will also be understood that in all other positions except that assumed in Figs. 1, 2 and 3, the ends of the arms 113 and 126 are in such contact with the cam-faced members 127 128 as to maintain a material compression on the contact with the cam-faced members 127 128 as to maintain a material compression on the springs 65 and 70 so as to cause the auxiliary friction gears 74 75 and 79 to be in engagement. It will also be understood that the object of constructing the fly-wheel connection as hereinbefore described, is to prevent the customary jerking and resultant strain on the gear shaft when connected directly to the drive shaft without the intervention of some yielding member or device designed to absorb the shock and strain.

I claim as my invention:

1. A power transmission apparatus comprising a prime mover, a drive shaft and driven shaft, a device for connecting and disconnecting the drive and driven shafts, auxiliary drive gears, shafts on which the auxiliary drive gears are mounted, speed changing gears and means in the continued movement of which in one direction the auxiliary drive gears and their shafts are simultaneously shifted toward the said driven shaft, the said speed changing gears are then successively connected and disconnected, the said device actuated to directly connect the drive and driven shafts and simultaneously therewith the said auxiliary drive gears and their shafts are shifted away from the said driven shaft.

2. A power transmission apparatus comprising a prime mover, a drive shaft, a driven shaft, a device for connecting and disconnecting the drive and driven shafts, a friction pulley on the drive shaft, speed gears on the driven shaft, an auxiliary shaft, a friction pulley on the said auxiliary shaft adapted to contact with the friction pulley on the drive shaft, speed gears on the said auxiliary shaft adapted to mesh with the speed gears on the driven shaft, and means in the continued movement of which in one direction, the said speed pulleys are successively connected and disconnected, the said device actuated to directly connect the drive and driven shafts and simultaneously therewith the said auxiliary shaft shifted laterally of the driven shaft to separate the said friction pulleys.

3. A power transmission device comprising a prime mover, a drive shaft, a driven shaft, a device for connecting and disconnecting the drive and driven shafts, a friction pulley on the drive shaft, speed gears on the driven shaft, a pair of auxiliary shafts mounted on the opposite sides of the said driven shaft and in a parallel relationship therewith, a friction pulley on each auxiliary shaft adapted to contact with the friction pulley on the drive shaft, speed changing gears on each of the said auxiliary shafts adapted respectively to mesh with the speed changing gears on the driven shaft, and means in the continued movement of which in one direction, the said pulleys are simultaneously connected and disconnected, the said device actuated to directly connect the drive and driven shafts and simultaneously therewith the said auxiliary shafts are shifted laterally of the driven shaft to separate the said friction pulleys.

4. A power transmission apparatus comprising a prime mover, a drive shaft, a driven shaft, means for directly connecting the driven shaft to the drive shaft, sets of auxiliary driving friction gears, sets of speed changing spur gears, shafts upon which the said auxiliary friction gears and speed changing gears are mounted, means for shifting the said auxiliary driving gears and the shafts upon which they are mounted simultaneously toward and away from the said driven shaft, and means for controlling both the aforesaid means and actuating the same in such a manner that when the one is operative the other is inoperative.

5. A power transmission apparatus comprising a prime mover, a drive shaft, a driven shaft, a clutch for connecting and disconnecting the drive and driven shafts, a lever for operating said clutch, a set of auxiliary drive gears, sets of speed changing gears, means operated by the said lever for shifting and disconnecting said auxiliary drive gears when the clutch is connected and connecting said auxiliary drive gears when the said clutch is disconnected, and means also operated by the said lever for connecting and disconnecting the said sets of speed changing gears when the said clutch is disconnected.

6. A power transmission apparatus comprising a prime mover, a drive shaft, a driven shaft, a clutch for connecting and disconnecting the drive and driven shafts, a lever for operating said clutch, gear shafts, a set of friction gears on said gear shafts, sets of speed changing gears on said gear shafts, gears on the driven shaft engaging the aforesaid gears, means operated by the said lever for laterally shifting and disconnecting the said friction gears on the gear shafts from the driven shaft when the said clutch is connected and connecting the said friction gears on the gear shafts to the said gear and driven shafts when the said clutch is disconnected, and means also operated by the said lever for connecting and disconnecting the speed changing gears on the said gear shafts with their gears on the driven shaft when the clutch is disconnected.

7. A power transmission apparatus comprising a prime mover, a drive shaft, a driven shaft, a clutch for connecting and disconnecting the drive and driven shafts, a lever for operating said clutch, a friction gear on the said drive shaft, gear shafts, a friction gear on each of the said gear shafts adapted to be brought into and moved out of contact with the said friction gear on the drive shaft, speed changing gears on the driven shaft, speed changing gears on each of the said gear shafts adapted to mesh with the said speed changing gears on the driven shaft, means operated by the said lever for shifting and so connecting and disconnecting the said friction gears, and means also operated by the said lever for connecting and disconnecting positively either of the said speed changing gears on the driven shaft with their speed changing gears on the said gear shafts.

8. A power transmission apparatus comprising a prime mover, a drive shaft, a driven shaft, a clutch for connecting and disconnecting the drive and driven shafts, a control lever for operating said clutch, a friction gear on the said drive shaft, gear shafts, a friction gear on each of the said gear shafts adapted to be connected and disconnected with the said friction gear on the drive shaft, speed changing gears on the driven shaft, speed changing gears on each of the said gear shafts adapted to mesh with the said speed changing gears on the intermediate shafts, means operated by the said lever for connecting and disconnecting the said friction gears, a gear clutch on the driven shaft between the said speed changing gears thereon, a gear clutch lever for actuating the said gear clutch, and means operated by the said control lever for actuating the said gear clutch lever to connect the said gear clutch with either of the said speed changing gears on the driven shaft when the said clutch is disconnected.

9. A power transmission apparatus comprising a prime mover, a drive shaft, a driven shaft, a clutch for connecting and disconnecting the drive and intermediate shafts, a control lever for operating said clutch, a friction gear on the said drive shaft, gear shafts, a friction gear on each of the said gear shafts adapted to be connected and disconnected with the said friction gear on the drive shaft, speed changing gears on the driven shaft, speed changing gears on each of the said gear shafts adapted to mesh with the said speed changing gears on the driven shafts, means operated by the said lever for connecting and disconnecting the said friction gears, a gear clutch on the driven shaft between the said speed changing gears thereon, a gear clutch lever for actuating the said gear clutch, a link pivotally connected at one end to the said control lever, and means associated with the said gear clutch lever and actuated by the said link by the movement of the said control lever for connecting said gear clutch with either of the said speed changing gears on the driven shaft when the said clutch is disconnected.

10. A power transmission apparatus comprising a prime mover, a drive shaft, a driven shaft, a clutch for connecting and disconnecting the drive and driven shafts, a control lever for operating said clutch, a friction gear on the said drive shaft, gear shafts, a friction gear on each of the gear shafts adapted to be connected and disconnected with the said friction gear on the drive shaft, speed changing gears on the driven shaft, speed changing gears on each of the said gear shafts adapted to mesh with the said speed changing gears on the driven shafts, means operated by the said control lever for connecting and disconnecting the said friction gears, a gear clutch on the driven shaft between the said speed changing gears thereon, a gear clutch lever for actuating the said gear clutch, a link pivotally connected at one end to the said control lever, a plate connected to the said gear clutch lever, an arm yieldingly mounted in the said plate and adapted to be engaged by the said link in such a manner that by the movement of the said control lever the said gear clutch lever is actuated to connect and disconnect the said gear clutch with either of the said speed changing gears on the driven shaft.

11. A power transmission apparatus comprising a prime mover, a drive shaft, a driven shaft, a clutch for connecting and disconnecting the drive and driven shafts, a control lever for operating said clutch, a friction gear on the said drive shaft, gear shafts, a friction gear on each of the said gear shafts adapted to be connected with and disconnected from the said friction gear on the drive shaft, speed changing gears on the driven shaft, speed changing gears on each of the said gear shafts adapted to mesh with the said speed changing gears on the driven shafts, means operated by the said control lever for connecting and disconnecting the said friction gears, a gear clutch on the driven shaft, between the said speed changing gears thereon, a gear clutch lever for actuating the said gear clutch, a link pivotally connected at one end to the said control lever and having recesses in its under side, a plate connected to the said gear clutch lever, a rod journaled in said plate, an arm connected to the said rod and adapted to be engaged by the under surface of the said link, a spring for normally maintaining the said arm in position, and means for maintaining the end of the said arm against the under surface of the said link.

12. A power transmission apparatus comprising a prime mover, a drive shaft, a driven shaft, a clutch for connecting and disconnecting the drive and driven shafts, a control lever for operating said clutch, a friction gear on the said drive shaft, gear shafts, a friction gear on each of the said gear shafts adapted to be connected with and disconnected from the said friction gear on the drive shaft, speed changing gears on the driven shaft, speed changing gears on each of the said gear shafts adapted to mesh with the said speed changing gears on the driven shaft, sleeves in which the said gear shafts are journaled, rods connected to the said sleeves, bearings in which the said rods are movable, rock shafts connected to the said bearings, arms connected to the last aforesaid rock shafts, cam-faced members connected to the said sleeves and against which the extremities of the said arms are adapted to contact, and connections between the last aforesaid rock shafts and the said lever.

13. A power transmission apparatus comprising a prime mover, a drive shaft, a driven shaft, a clutch for connecting and disconnecting the drive and driven shafts, a lever for operating said clutch, a friction gear on the said drive shaft, gear shafts, a friction gear on each of the said gear shafts adapted to be connected with and disconnected from the said friction gear on the drive shaft, speed changing gears on the driven shaft, speed changing gears on each of the said gear shafts adapted to mesh with the said speed changing gears on the driven shaft, and means operated by the said lever for connecting and disconnecting positively either of the said speed changing gears on the driven shaft with their speed changing gears on the said gear shafts.

14. A power transmission apparatus comprising a prime mover, a drive shaft, a driven shaft, a clutch for connecting and disconnecting the drive and driven shafts, a control lever for operating said clutch, a friction gear on the said drive shaft, gear shafts, a friction gear on each of the said gear shafts adapted to be connected with and disconnected from the said friction gear on the drive shaft, speed changing gears on the driven shaft, speed changing gears on each of the said gear shafts adapted to mesh with the said speed changing gears on the driven shaft, a gear clutch on the driven shaft between the said speed changing gears thereon, a gear clutch lever for actuating the said gear clutch, and means operated by the control lever for actuating the said gear clutch lever to connect the said gear clutch with either of the said speed changing gears on the driven shaft when the said clutch is disconnected.

15. A power transmission apparatus comprising a prime mover, a drive shaft, a driven shaft, a clutch for connecting and disconnecting the drive and driven shafts, a control lever for operating said clutch, a friction gear on the said drive shaft, gear shafts, a friction gear on each of the said gear shafts adapted to be connected with and disconnected from the said friction gear on the drive shaft, speed changing gears on the driven shaft, speed changing gears on each of the said gear shafts adapted to mesh with the said speed changing gears on the driven shaft, a gear clutch on the driven shaft between the said speed changing gears thereon, a gear clutch lever for actuating the said gear clutch, a link pivotally connected at one end to the said control lever, and means associated with the said gear clutch lever and actuated by the said link by the movement of the said control lever for connecting said gear clutch with either of the said speed changing gears on the driven shaft when the said clutch is disconnected.

16. A power transmission apparatus comprising a prime mover, a drive shaft, a driven shaft, a clutch for connecting and disconnecting the drive and driven shafts, a control lever for operating said clutch, a friction gear on the said drive shaft, gear shafts, a friction gear on each of the said gear shafts adapted to be connected with and disconnected from the said friction gear on the drive shaft, speed changing gears on the driven shaft, speed changing gears on each of the said gear shafts adapted to mesh with the said speed changing gears on the driven shaft, a gear clutch on the driven shaft between the said speed changing gears thereon, a gear clutch lever for actuating the said gear clutch, a link pivotally connected at one end to the said control lever, a plate connected to the said gear clutch lever, an arm yieldingly mounted in the said plate and adapted to be engaged by the said link in such a manner that by the movement of the said control lever the said gear clutch lever is actuated to connect and disconnect the said gear clutch with either of the said speed changing gears on the driven shaft.

Signed by me this 27th day of November 1909.

LOUIS B. MAY.

Witnesses:
A. H. SERRELL,
E. ZACHARIASEN.

---

Copies of this patent may be obtained for five cents each, by addressing the "Commissioner of Patents, Washington, D. C."